United States Patent
Axelson

(10) Patent No.: US 6,923,354 B2
(45) Date of Patent: Aug. 2, 2005

(54) TAILGATE TOOLBOX

(76) Inventor: Garth Axelson, 87 Bernard Court, NW, Calgary, Alberta (CA), T3K 2B3

( * ) Notice: Subject to any disclaimer, the term of this patent is extended or adjusted under 35 U.S.C. 154(b) by 173 days.

(21) Appl. No.: 10/327,809

(22) Filed: Dec. 24, 2002

(65) Prior Publication Data

US 2004/0118887 A1 Jun. 24, 2004

(51) Int. Cl.⁷ .............................................. B60R 11/06
(52) U.S. Cl. ........................ 224/404; 224/281; 224/547; 224/554; 224/557; 296/37.6; 312/334.1
(58) Field of Search ........................ 224/547, 554–557, 224/566, 567, 569, 571, 403, 404, 281, 42.32; 296/37.6; 109/50, 52; 312/334.1, 334.7, 349, 330.1

(56) References Cited

U.S. PATENT DOCUMENTS

| | | | | |
|---|---|---|---|---|
| 2,784,027 A | * | 3/1957 | Temp | 224/404 |
| 4,522,326 A | * | 6/1985 | Tuohy, III | 224/404 |
| 4,573,731 A | * | 3/1986 | Knaack et al. | 296/37.6 |
| 4,728,017 A | * | 3/1988 | Mullican | 224/404 |
| 4,733,898 A | * | 3/1988 | Williams | 224/404 |
| 5,395,019 A | * | 3/1995 | Christensen | 224/403 |
| 5,924,616 A | * | 7/1999 | Shives | 224/404 |
| 5,964,492 A | * | 10/1999 | Lyon | 296/37.6 |
| 5,979,725 A | * | 11/1999 | Lehrman | 224/539 |
| 6,082,804 A | * | 7/2000 | Schlachter | 296/37.6 |
| 6,422,629 B2 | * | 7/2002 | Lance et al. | 296/37.6 |
| 6,695,375 B1 | * | 2/2004 | May | 296/37.6 |

* cited by examiner

Primary Examiner—Nathan J. Newhouse
(74) Attorney, Agent, or Firm—George A. Seaby

(57) ABSTRACT

A toolbox assembly for mounting in the box of a pickup truck includes a rectangular casing with an open front end; a drawer slidable in said casing; a lock on said drawer for locking the drawer in the casing; a pair of L-shaped brackets for mounting on the floor of the box immediately rearwardly of the wheel wells, the brackets slidably receiving the casing; and a lock mechanism for releasably locking the casing in said brackets.

4 Claims, 4 Drawing Sheets

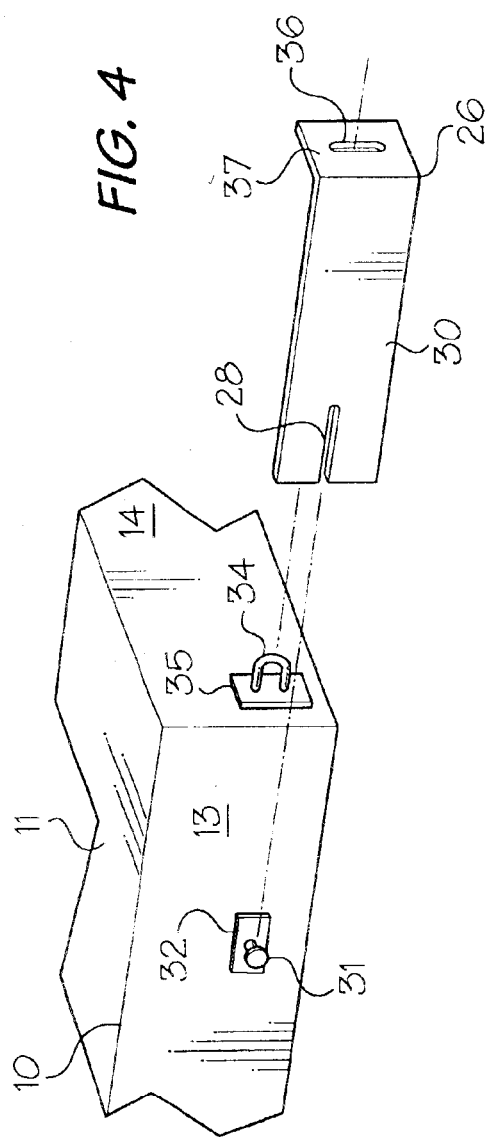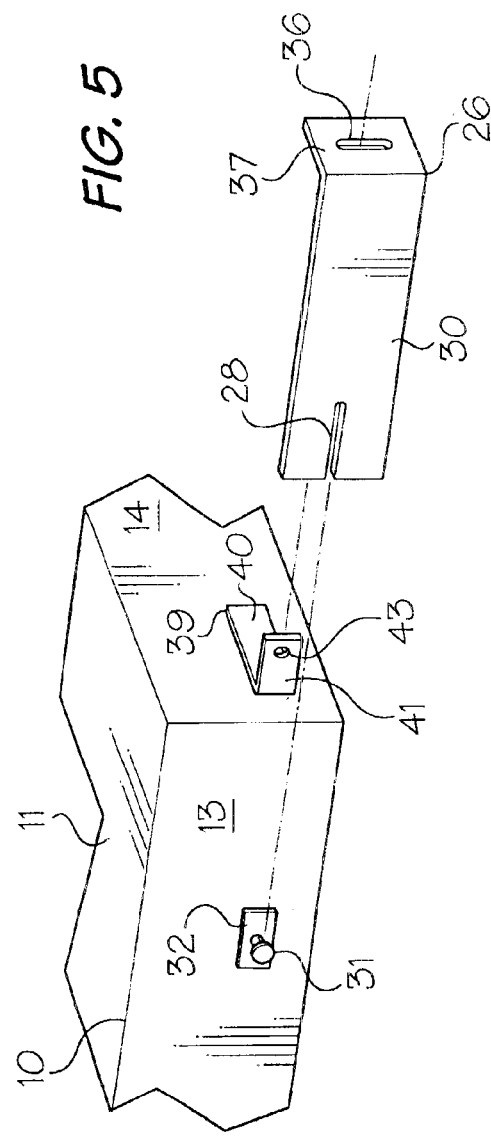

TAILGATE TOOLBOX

BACKGROUND OF THE INVENTION

1. Field of the Invention

This invention relates to a toolbox assembly, and in particular to a toolbox for removable mounting in the box of a pickup truck.

In some jurisdictions, a firearm cannot legally be carried loose in a motor vehicle, i.e. a firearm must be locked in a trunk, which is not available on a pickup truck, or carried in a locked container on or in the vehicle. Since the advent of the pickup truck a great many containers of various shapes and sizes have been designed for mounting in the box of vehicles to carry tools and other valuable items or simply to protect things from the environment.

2. Discussion of the Prior Art

Examples of containers for use on pickup trucks are disclosed by U.S. Pat. No. 4,249,684, issued to K. Miller et al on Feb. 10, 1981 U.S. Pat. No. 4,266,821, issued to L. M. Gillet on May 12, 1981; U.S. Pat. No. 5,518,158, issued to W. L. Matlack on May 21, 1996; U.S. Pat. No. 5,634,577, issued to J. C. Pearson, Jr. et al on Jun. 3, 1997; U.S. Pat. No. 5,988,473, issued to S. L. Hagan et al on Nov. 23, 1999; U.S. Pat. No. 5,996,868, issued to A. C. Paradis on Dec. 7, 1999; U.S. Pat. No. 6,006,971, issued to C. R. Coleman et al on Dec. 28, 1999; U.S. Pat. No. 6,068,319, issued to P. O'Brien on May 30, 2000; U.S. Pat. No. 6,077,007, issued to E. A. Porter et al on Jun. 20, 2000; U.S. Pat. No. 6,203,087, issued to M. Lance et al on Mar. 20, 2001 and U.S. Pat. No. 6,253,976, issued to C. R. Coleman et al on Jul. 3, 2001.

Many of the patented or commercially available containers are somewhat complicated and/or difficult to mount on a vehicle. Moreover, to a large extent, existing toolboxes and other containers are designed for more or less permanent attachment to a vehicle. Thus, with a toolbox in place, certain areas of a truck box are not available for other purposes such as for mounting a fifth wheel hitch. Fifth wheels for pickup trucks are usually mounted between the wheel wells on the floor of a pickup truck box. A permanently mounted container near the tailgate of a pickup truck can present difficulties with respect to the mounting of a hitch or the removal of the container when connecting a trailer to the vehicle.

GENERAL DESCRIPTION OF THE INVENTION

The object of the present invention is to provide a toolbox assembly which permits the quick and easy mounting and removal of a toolbox from the box of a pickup truck.

Accordingly, the invention relates to a toolbox assembly for a pickup truck having a box defined by a floor, side walls and a tailgate pivotally connected to the rear end of the box for rotation between closed and open positions, said toolbox comprising:

a casing including a top wall, a bottom wall, side walls, a rear end wall and an open front end;

a lockable drawer slidably mounted in said open front end for movement between closed and open positions;

a pair of spaced apart brackets for mounting on the floor of the truck for slidably receiving said casing; and a lock mechanism for locking said casing in said brackets, whereby the toolbox can be slid into said brackets and releasably locked in position on the floor of the truck box.

BRIEF DESCRIPTION OF THE DRAWINGS

The invention is described below in greater detail with reference to the accompanying drawings, wherein:

FIGS. 4 and 5 are exploded, isometric views of lock mechanisms used on the toolbox assembly of FIGS. 1 to 3.

DESCRIPTION OF THE PREFERRED EMBODIMENT

Figure 1:
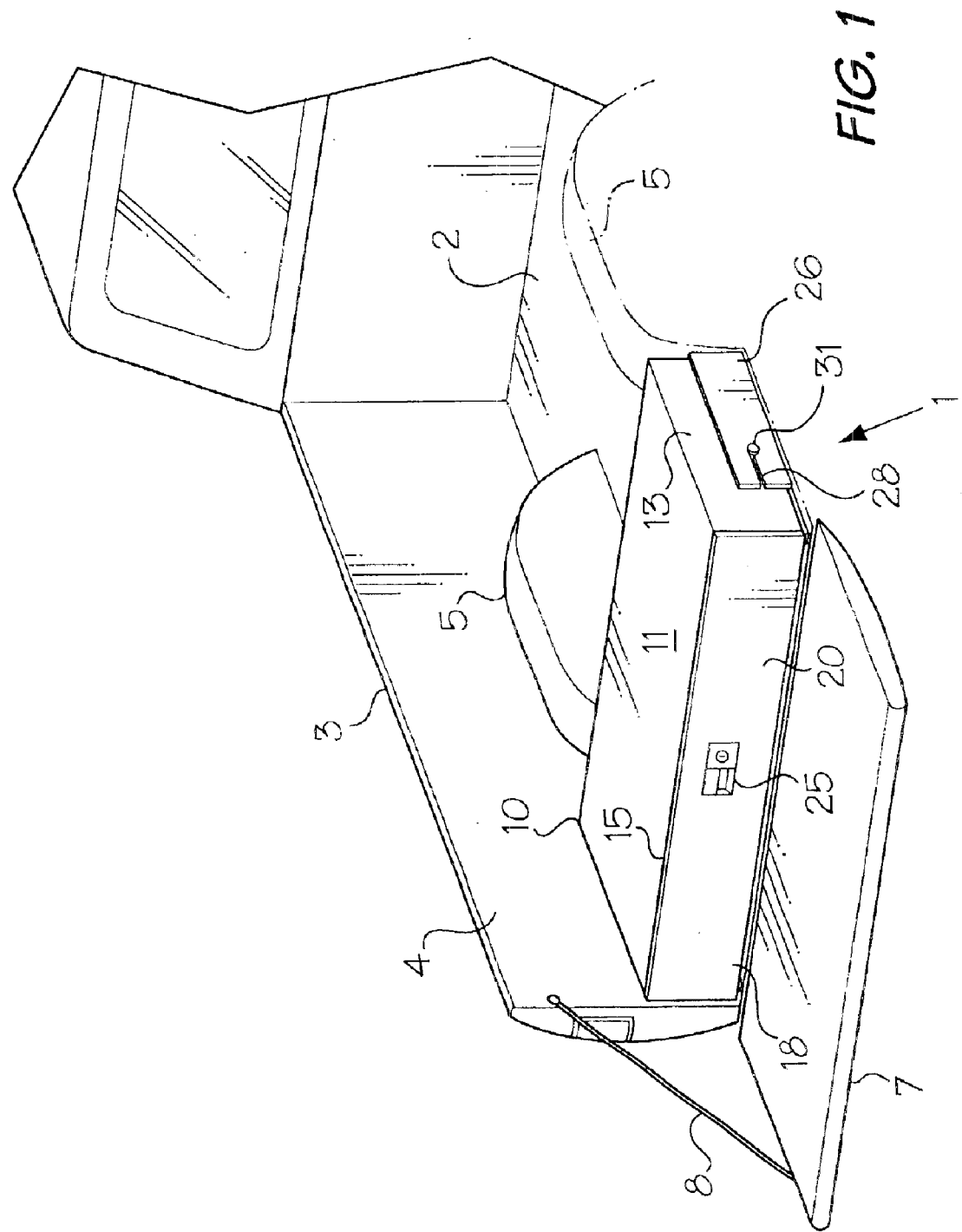
FIGS. 1 and 2 are isometric views of a portion of the rear end of a pickup truck and a toolbox assembly in accordance with the invention.
Figure 2:
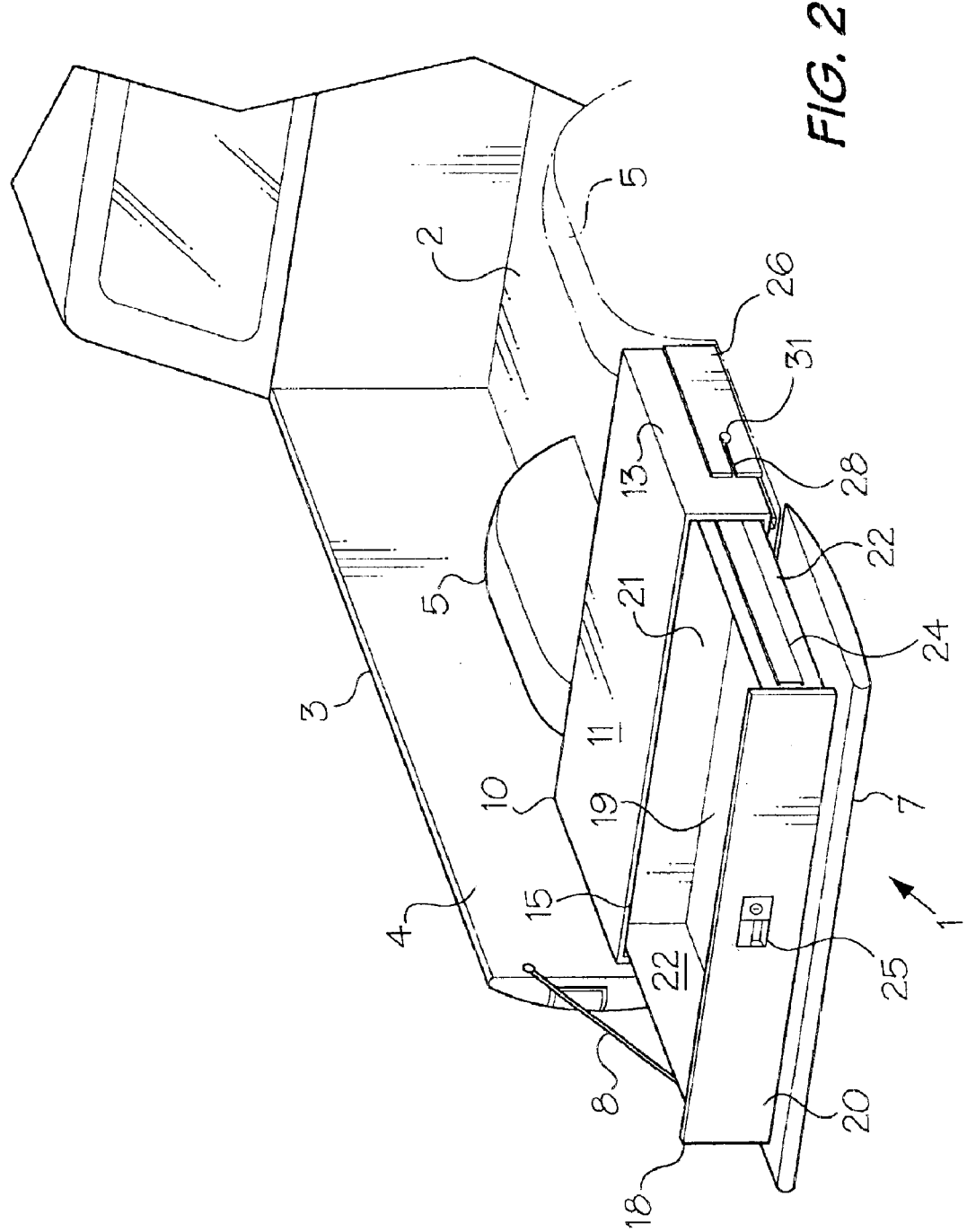

With reference to FIGS. 1 and 2, the toolbox of the present invention which is indicated generally at 1 is intended for use on the rear end of the floor 2 of a conventional pickup truck 3. The box of the truck includes sides 4 (one shown) with wheel wells 5 extending inwardly therefrom. A tailgate 7 is pivotally connected to the rear end of the floor 2 of the truck and is held in a roughly horizontal, open position by cables 8 (one shown) extending between the sides 4 of the truck box and the top ends of the tailgate.

Figure 3:
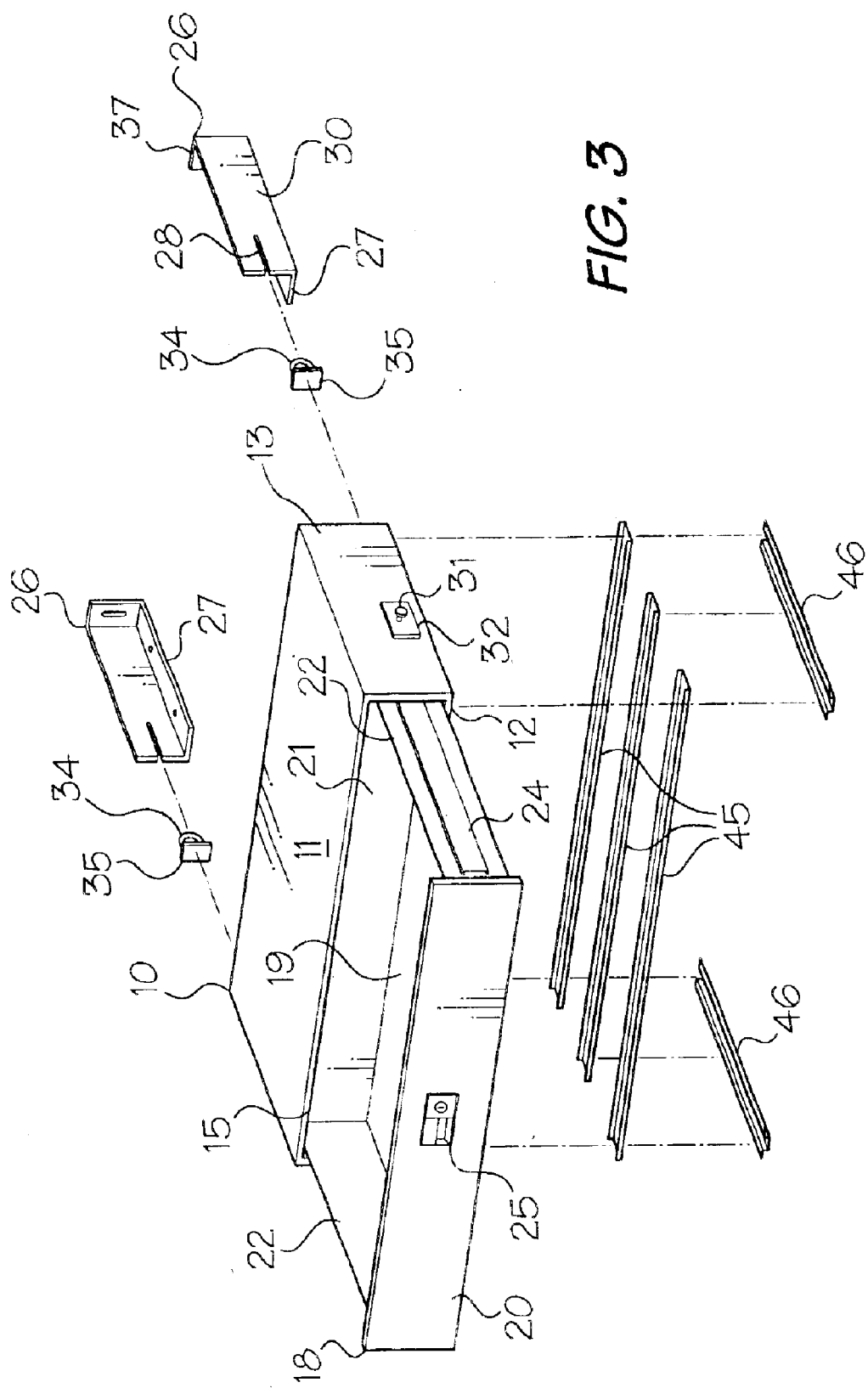
FIG. 3 is an exploded, isometric view of the toolbox assembly of the present invention.

The toolbox 1 includes a casing 10 formed of sheet metal or plastic. The casing is defined by a top wall 11, a bottom wall 12 (FIG. 3), side walls 13 (one shown), a rear wall 14 (FIGS. 4 and 5) and an open front end 15. A drawer 18 is slidably mounted in the casing 10 for movement between a closed position (FIG. 1) and an open position (FIGS. 2 and 3). The drawer 18 includes a bottom wall 19, a front wall 20, a rear wall 21 and side walls 22. Rails 24 on the side wall 22 slide in tracks (not shown) on the interior of the side walls 13 of the casing 10 for opening and closing the drawer. A conventional lock and operating handle combination 25 are provided in the front wall 20 of the drawer.

The toolbox 1 is removably mounted in the truck box using a pair of brackets 26. The brackets 26 are L-shaped in cross section and when viewed from above. The bottom arms or bases 27 (FIG. 3) of the brackets 26 are bolted to the floor 2 of the truck box. Slots 28 in free ends of the vertical, sides 30 of the brackets 26 receive pins 31 extending outwardly from plates 32 on the side walls 13 of the toolbox casing 10 to position the toolbox in the truck.

As best shown in FIG. 4 the toolbox is releasably locked in position using a lock assembly including loops 34 extending outwardly from plates 35 on the rear wall 14 of the casing 10 near the corners thereof. When the casing 10 is slid into the brackets 26, the loops 34 extend through slots 36 in vertical ends 37 of the brackets 26. A padlock (not shown) is used to releasably lock the toolbox in the brackets 26.

Referring to FIG. 5, alternative lock assembly includes L-shaped brackets 39. One arm 40 of each bracket 39 is spot welded or otherwise connected on the rear wall 14 of the casing 10 near a corner thereof. When the casing 10 is slid into the brackets 26, the other arms 41 of the brackets extend through the slots 36. Holes 43 in the arms 41 define loops for receiving a padlock to lock the toolbox in the brackets 26.

Because the tailgate 7 of most pickup trucks is not exactly horizontal in the open position (FIGS. 1 and 2), i.e. the tailgate is inclined slightly upwardly and rearwardly, it would not be possible to open the drawer 18 if the casing 10 was mounted directly on the floor of the truck box. Accordingly, a platform defined by a plurality of transversely and longitudinally extending metal strips 45 and 46, respectively, is provided on the bottom of the casing 10. The strips 45 and 46 are welded or otherwise secured to the bottom of the casing 10. Of course, by suitably constructing the casing 10, e.g. with a thicker base, the platform can be dispensed with. However, it is more practical to provide a platform connected to the bottom of a more conventional casing 10.

With the above described toolbox construction and the location of the toolbox on a truck, access to the drawer 18 is denied until the tailgate is opened. Thus, a locked tailgate and a locked toolbox provide a double measure of security. When the toolbox is mounted in the brackets 26, the bolts holding the brackets in position are not accessible.

I claim:

1. A toolbox assembly for a pickup truck having a box defined by a floor, side walls and a tailgate pivotally connected to the rear end of the box for rotation between closed and open positions, said toolbox comprising:

a casing including a top wall, a bottom wall, side walls, a rear end wall and an open front end;

a lockable drawer slidably mounted in said open front end for movement between closed and open positions;

a pair of spaced apart brackets for mounting on the floor of the truck for slidably receiving said casing having L-shaped cross sections and including sides for slidably receiving the side walls of the casing, and bases for securing the brackets to the floor of a pickup truck adjacent to side walls of a truck box; and a lock mechanism for locking said casing in said brackets, whereby the toolbox can be slid into said brackets and releasably locked in position on the floor of the truck box.

2. A toolbox assembly according to claim 1, including pins extending outwardly from the sides of the casing, and first slots in said brackets for slidably receiving said pins to position the casing in said brackets.

3. A toolbox assembly according to claim 2, wherein said lock mechanism includes loops extending outwardly from said rear wall of said casing for receiving a padlock; and second slots in said brackets for receiving said loops, whereby, when said loops are inserted through said slots, padlocks can be inserted into said loops to lock the toolbox in said brackets.

4. A toolbox assembly according to claim 3, wherein each said bracket is L-shaped when viewed from above, the side of each bracket having a free end containing said first slot for receiving said pin on the casing, and an end wall containing said second slot for receiving one said loop.

* * * * *